US007480829B2

(12) United States Patent
Dickenson et al.

(10) Patent No.: US 7,480,829 B2
(45) Date of Patent: Jan. 20, 2009

(54) METHOD, SYSTEM AND COMPUTER PROGRAM PRODUCT FOR RECOVERY OF FORMATTING IN REPAIR OF BAD SECTORS IN FLASH MEMORY

(75) Inventors: Marc A. Dickenson, Austin, TX (US); John S. Langford, Austin, TX (US); Atit D. Patel, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 466 days.

(21) Appl. No.: 11/274,850

(22) Filed: Nov. 15, 2005

(65) Prior Publication Data

US 2007/0168702 A1    Jul. 19, 2007

(51) Int. Cl.
*G06F 11/00* (2006.01)
(52) U.S. Cl. ............ 714/42; 714/2; 714/5; 714/6; 714/15; 707/202; 707/205; 711/170; 711/173; 711/202; 711/206; 711/207; 713/1; 713/2
(58) Field of Classification Search ............ 714/42, 714/5, 6, 54, 710, 718, 723, 15; 711/114, 711/115, 170, 173, 202, 206–208; 207/205
See application file for complete search history.

(56) References Cited

U.S. PATENT DOCUMENTS

| 5,694,600 | A | 12/1997 | Khenson et al. |
| 6,175,904 | B1 | 1/2001 | Gunderson |
| 6,839,864 | B2* | 1/2005 | Mambakkam et al. ......... 714/5 |
| 7,093,161 | B1* | 8/2006 | Mambakkam et al. ........ 714/15 |
| 7,275,177 | B2* | 9/2007 | Armangau et al. ............. 714/5 |
| 2003/0014619 | A1* | 1/2003 | Cheston et al. ................ 713/1 |
| 2004/0044886 | A1* | 3/2004 | Ng et al. ......................... 713/1 |
| 2004/0143703 | A1* | 7/2004 | Emberty et al. ............. 711/115 |
| 2004/0153840 | A1* | 8/2004 | Buchanan et al. ............. 714/42 |
| 2004/0210792 | A1* | 10/2004 | Foster et al. .................... 714/5 |
| 2005/0015652 | A1* | 1/2005 | Han et al. ....................... 714/6 |

\* cited by examiner

*Primary Examiner*—Gabriel L Chu
*Assistant Examiner*—Chae Ko
(74) *Attorney, Agent, or Firm*—Casimer K. Salys; Dillon & Yudell LLP

(57) ABSTRACT

A method for correcting a formatting error in a flash memory is disclosed. An error in a first formatting of a first flash memory is discovered, and a second formatting is extracted from a second flash memory storing second data. The erroneous first formatting is replaced with a modification of the second formatting, and first data is stored in the first flash memory with the modification of the second formatting. The first data is different from the second data.

20 Claims, 4 Drawing Sheets

METHOD, SYSTEM AND COMPUTER PROGRAM PRODUCT FOR RECOVERY OF FORMATTING IN REPAIR OF BAD SECTORS IN FLASH MEMORY

CROSS-REFERENCE TO RELATED APPLICATION

The present application is related to the following co-pending U.S. patent application filed on even date herewith, and incorporated herein by reference in its entirety:

Ser. No. 11/274,627, entitled "METHOD, SYSTEM AND COMPUTER PROGRAM PRODUCT FOR RECOVERY OF FORMATTING IN REPAIR OF BAD SECTORS IN DISK DRIVES".

BACKGROUND OF THE INVENTION

1. Technical Field

The present invention relates in general to data processing systems and in particular to flash memory within data processing systems. Still more particularly, the present invention relates to a system, method and computer program product for recovery of formatting in repair of bad sectors in flash memory of a data processing system.

2. Description of the Related Art

Many microprocessor-based devices and systems use so-called "flash memory" devices, which employ a particular form of EEPROM (Electronically Erasable Programmable Read-Only Memory) to store data. Such devices can include, for example, computers, mobile telephones, electronic toys, cameras, and domestic appliances such as washing machines. Indeed, almost every microprocessor-based product in production today employs flash memory.

Flash memory maintains stored information without requiring a power source. Flash memory differs from typical EEPROM in that EEPROM erases its content one byte at a time, making a typical EEPROM slow to update. Flash memory can erase its data in entire blocks, making flash memory a preferable technology for applications that require frequent updating of large amounts of data, as in the case of a memory stick.

Inside a flash memory chip, information is stored in cells. A floating gate protects the data written in each cell. Tunneling electrons pass through a low conductive material to change the electronic charge of the gate in "a flash," clearing the cell of its contents so that it can be rewritten. This "flash" for clearing cell contents is the basis of the 'flash memory' name.

Unfortunately, one of the largest contributors to the probability of failure for a device incorporating a flash memory is the flash memory itself. As flash memory components are usually soldered to other components such as a main circuit board, a flash memory failure will often result in the need to replace not only the flash memory, but other components as well. The degree to which flash memory has become deeply integrated into devices has caused device designers to create methods for correcting errors in flash memory, most of which depend on manual intervention by a user or on redundant storage of data.

In data processing systems, the formatting for data stored in a flash memory can become corrupted or damaged for a variety of reasons, for example, loss of power during a write or a format operation. As with the error correction methods for other problems in flash memory, prior art methods for recovering from corruption of this formatting data involve the constant maintenance of redundant copies of the data or require that the user corrects the corruption of the formatting through replacement or manual repair.

The state of prior art methods results in several drawbacks. First, maintaining redundant copies of formatting data is not desirable, because such maintenance increases storage requirements. This concern about storage requirements becomes particularly important in embedded systems or other systems in which storage resources are limited. Similarly, prior art methods that require the user to correct the corruption of the formatting through replacement or manual repair involve time costs to the user or information technology personnel. The reduction of such costs is desired.

SUMMARY OF THE INVENTION

A method for correcting a formatting error in a flash memory is disclosed. An error in a first formatting of a first flash memory is discovered, and a second formatting is extracted from a second flash memory storing second data. The erroneous first formatting is replaced with a modification of the second formatting, and first data is stored in the first flash memory with the modification of the second formatting. The first data is different from the second data.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed descriptions of an illustrative embodiment when read in conjunction with the accompanying drawings, wherein:

DETAILED DESCRIPTION OF THE PREFERRED EMBODIMENT

The present invention takes advantage of a dual media image design, in which similar copies of formatting data, also called critical data, exist in different sectors in a flash memory or within multiple units of flash memory. If and when an interruption to an operation touching formatting data causes corruption of a sector of formatting data, the present invention detects the corruption and utilizes a similarly formatted sector as a template to reconstruct the corrupted formatting. The reconstructed formatting is then used to repair the corrupted sector, allowing the system to return to full capability and function without alerting the user to the corruption. The present invention provides a solution to data corruption without requiring specific redundant copies of formatting data or requiring user intervention.

Figure 1A:
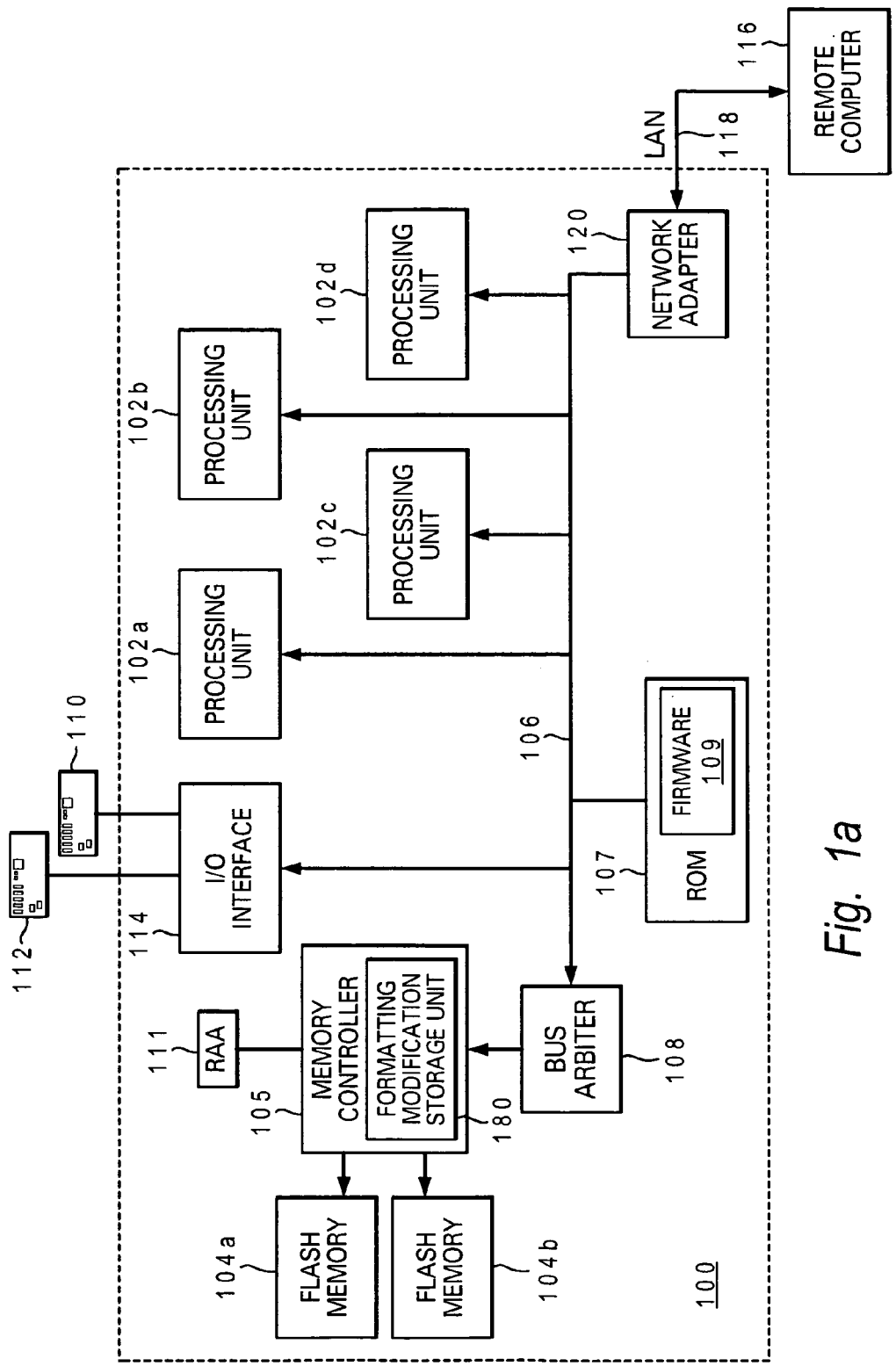
FIG. 1A depicts a block diagram of a data processing system in which a preferred embodiment of the method, system and computer program product for recovery of formatting for repair of bad sectors in flash memory attached to a data processing system is implemented.

With reference now to figures and in particular with reference to FIG. 1A, there is depicted a data processing system 100 that may be utilized to implement the method, system and computer program product of the present invention. For discussion purposes, the data processing system is described herein as having features common to a server computer. However, as used herein, the term "data processing system," is intended to include any type of computing device or machine that is capable of receiving, storing and running a software product, including not only computer systems, but also devices such as communication devices (e.g., routers, switches, pagers, telephones, electronic books, electronic magazines and newspapers, etc.), data storage devices, and personal and consumer electronics devices (e.g., handheld computers, Web-enabled televisions, home automation systems, multimedia viewing systems, etc.).

FIG. 1A and the following discussion are intended to provide a brief, general description of an exemplary data processing system adapted to implement the present invention. While parts of the invention will be described in the general context of instructions residing as firmware within ROM within a server computer, those skilled in the art will recognize that the invention also may be implemented in a combination of program modules running in an operating system. Generally, program modules include routines, programs, components and data structures, which perform particular tasks or implement particular abstract data types. The invention may also be practiced in distributed computing environments where tasks are performed by remote processing devices that are linked through a communications network. In a distributed computing environment, program modules may be located in both local and remote memory storage devices.

Data processing system 100 includes one or more processing units 102a-102d, at least two units of flash memory 104a-104b coupled to a memory controller 105, at least one unit of RAM 111 coupled to memory controller 105, and a system interconnect fabric 106 that couples memory controller 105 to processing unit(s) 102a-102d and other components of data processing system 100. Commands on system interconnect fabric 106 are communicated to various system components under the control of bus arbiter 108.

Data processing system 100 further includes additional non-volatile bulk storage media, such as a first hard disk drive 110 and a second hard disk drive 112. First hard disk drive 110 and second hard disk drive 112 are communicatively coupled to system interconnect fabric 106 by an input-output (I/O) interface 114. Although hard disks are described above, it should be appreciated by those skilled in the art that other types of media which are readable by a computer, such as a removable magnetic disks, CD-ROM disks, magnetic cassettes, flash memory cards, digital video disks, Bernoulli cartridges, and other later-developed hardware, may also be used to provide non-volatile bulk data storage in the exemplary computer operating environment. Additional non-volatile storage is provided in ROM 107, which contains firmware 109 for performing various essential system operations. The present invention is performed using instructions stored as firmware 109 within ROM 107 and is illustrated with respect to two units of flash memory 104a-104b coupled to a memory controller 105, which contains a memory unit called a formatting modification storage unit 180. The present invention is also applicable to first hard disk drive 110 and second hard disk drive 112 and a wide range of other media that employ dual media image design.

Data processing system 100 may operate in a networked environment using logical connections to one or more remote computers, such as remote computer 116. Remote computer 116 may be a server, a router, a peer device or other common network node, and typically includes many or all of the elements described relative to data processing system 100. In a networked environment, program modules employed by data processing system 100, or portions thereof, may be stored in a remote memory storage device, such as remote computer 116. The logical connections depicted in FIG. 1A include connections over a local area network (LAN) 118, but, in alternative embodiments, may include a wide area network (WAN).

When used in a LAN networking environment, data processing system 100 is connected to LAN 118 through an input/output interface, such as a network adapter 120. It will be appreciated that the network connections shown are exemplary and other means of establishing a communications link between the computers may be used.

Figure 1B:
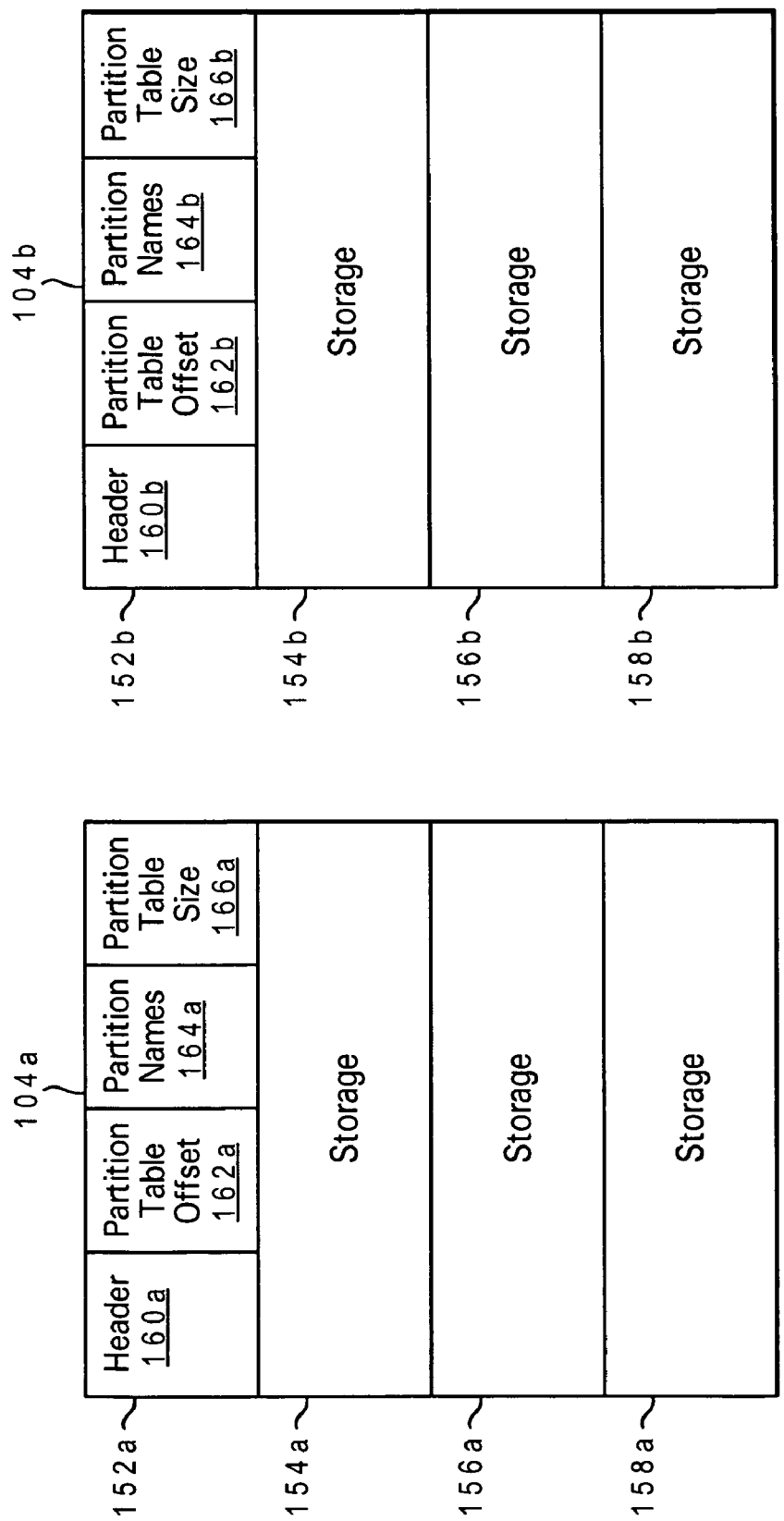
FIG. 1B depicts flash memory attached to a data processing system in accordance with a preferred embodiment of the present invention.

Referring now to FIG. 1B, flash memory attached to a data processing system in accordance with a preferred embodiment of the present invention is illustrated. Flash memory 104a contains four sectors 152a-158a. Sector 152a contains a header 160a, a partition table offset 162a, partition names 164a and a partition table size 166a, which are collectively referred to as formatting data 160a-166a, while sectors 154a-158a contain stored data, such as that data used by applications. Flash memory 104b contains four sectors 152b-158b. Sector 152b contains a header 160b, a partition table offset 162b, partition names 164b and a partition table size 166b, which are collectively referred to as formatting data 160b-166b, while sectors 154b-158b contain stored data, such as that data used by applications. Thus, sectors 154a-158a of flash memory 104a may (and usually do) contain first data different from the second data within sectors 154b-158b of flash memory 104b.

Figure 2:
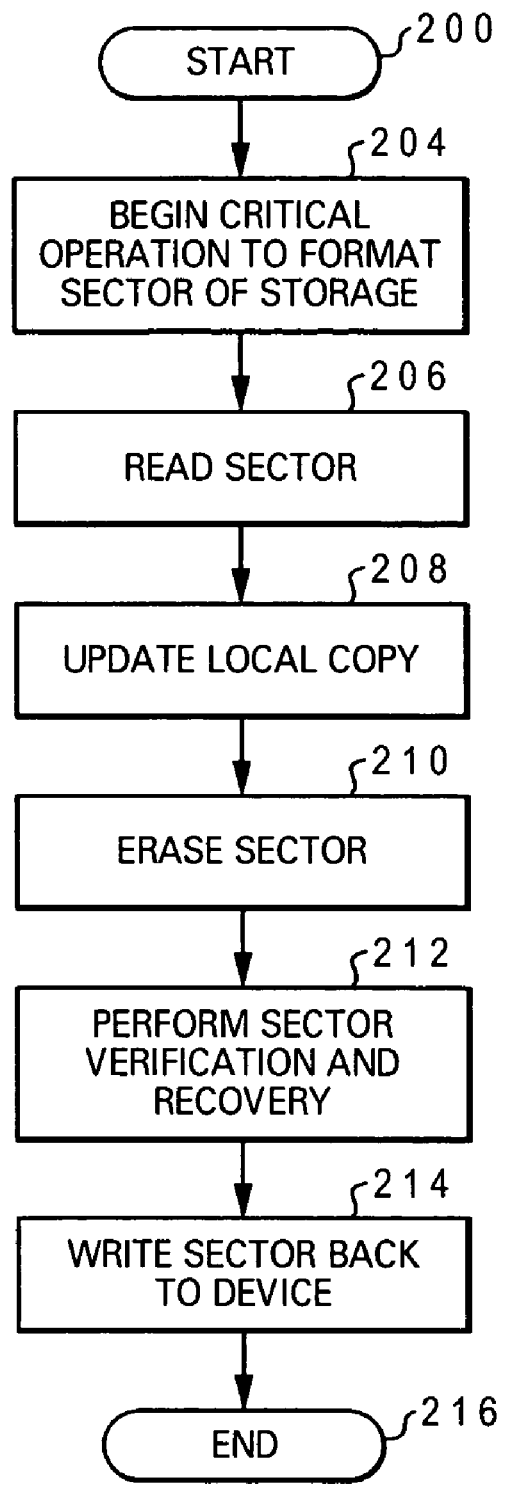
FIG. 2 illustrates a high-level logical flowchart of a method for reading and writing data, which includes performing recovery of formatting in repair of bad sectors in flash memory attached to a data processing system in accordance with a preferred embodiment of the present invention.

Turning now to FIG. 2, a high-level logical flowchart of a method for reading and writing data, which includes performing recovery of formatting for repair of bad sectors in storage systems attached to a data processing system in accordance with a preferred embodiment of the present invention is illustrated.

Figure 3:
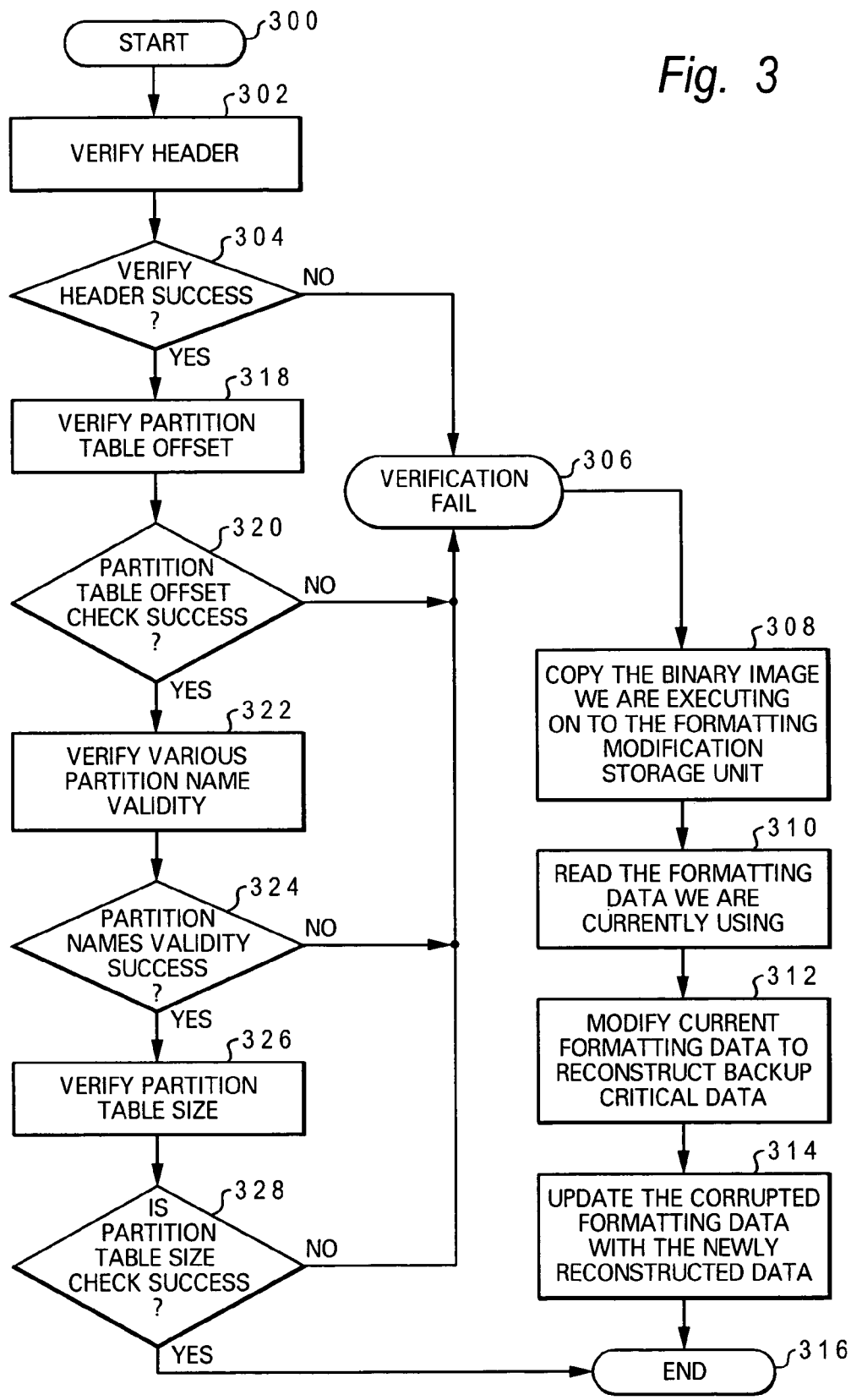
FIG. 3 depicts a high-level logical flowchart of a method for performing recovery of formatting in repair of bad sectors in flash memory attached to a data processing system in accordance with a preferred embodiment of the present invention.

For illustrative purposes, the exemplary discussion of FIG. 2 and FIG. 3 contained herein will refer to a format operation being performed on flash memory 104a, with flash memory 104b to provide backup format data. One skilled in the art will quickly realize that either of flash memory 104a and flash memory 104b may provide backup to the other during format operations. The process starts at step 200, and then proceeds to step 204, which depicts memory controller 105 beginning a critical operation to a format sector 152a of storage within flash memory 104a. The process next moves to step 206. At step 206, memory controller 105 reads sector 152a of flash memory 104a. The process then proceeds to step 208, which illustrates memory controller 105 updating a local copy of the data contained in the sector 152a of flash memory 104a read in step 206. The process next moves to step 210.

At step 210, memory controller 105 erases the sector 152a of flash memory 104a read in step 206. The process then proceeds to step 212. At step 212, memory controller 105 performs verification and recovery functions on the formatting data 160a-166a of sector 152a read in step 206. The verification and recovery functions of step 212 are detailed below with respect to FIG. 3. The process next moves to step 214. At step 214, memory controller 105 rewrites the sector 152a of flash memory 104a read in step 206. The process then ends at step 216.

Referring now to FIG. 3, a high-level logical flowchart of a method for performing recovery of formatting for repair of bad sectors in flash memory systems attached to a data processing system in accordance with a preferred embodiment of the present invention is depicted. The process starts at step 300 and then moves to step 302, which illustrates memory controller 105 verifying the header 160a of the sector 152a of flash memory 104a read in step 206. The process then proceeds to step 304. At step 304, memory controller 105 determines whether the verification of the header 160a of the sector 152a of flash memory 104a read in step 206 succeeded. If the verification of the header 160a of the sector 152a of flash memory 104a read in step 206 did not succeed, then the process moves to step 306.

Steps 306-316 represent a generalized recovery process, which is used in response to the determination of a failure of a verification at any of step 304 and steps 318-328 (which are explained below). At step 306, memory controller 105 asserts an internal flag bit indicating a verification failure. The process next proceeds to step 308, which illustrates memory controller 105 copying a binary image of a sector 152b of flash memory 104b, which is similar to the sector 152a of flash memory 104a read in step 206, to a formatting modification storage unit 180 in memory controller 105. The process then moves to step 310, which depicts memory controller 105 reading the formatting data 160b-166b from the binary image in formatting modification storage unit 180 of sector 152b of flash memory 104b. The process next proceeds to step 312. At step 312, memory controller 105 modifies, to the extent necessary, the formatting data 160b-166b from the binary image in formatting modification storage unit 180 of sector 152b of flash memory 104b for use as a replacement for the corrupted formatting data 160a-166a of sector 152a of flash memory 104a read in step 206.

The necessary modifications will vary with particular embodiments of the present invention and on the basis of differences between the particular type of flash memory used and the particular data stored in sectors 154a-158a of flash memory 104a and in sectors 154b-158b of flash memory 104b. In a preferred embodiment, some data from formatting data 160b-166b is capable of direct reuse. For instance, data extracted from header 160b is directly reusable in header 160a. Likewise, partition table offset 162b is directly reusable as partition table offset 162a and partition table size 166b is directly reusable as partition table size 166a.

In a preferred embodiment, partition names 164a will be derived by changing the trailing digit of partition names 164b to correspond to a designator identifying the flash memory 104a in which they exist. A preferred embodiment contains flash memory 104b, which is designated by convention as 'flash memory 2' with partition names boot2, kern2, dump2 and user2. A preferred embodiment also contains flash memory 104a, which is designated by convention as 'flash memory 1'. When modifying partition names 164b for use as partition names 164a, memory controller 105 will create partition names boot1, kern1, dump1 and user1.

In alternative embodiments, other formatting data 160b-166b, such as partition names 164a will be derived from a scan of the sectors 154a-158a of flash memory 104a. Following block 312, the process then moves to step 314, which illustrates memory controller 105 updating the sector 152a of flash memory 104a read in step 206 with the formatting created in step 312 for use as a replacement for the corrupted formatting data 160a-166a formerly present in the sector 152a of flash memory 104a read in step 206. The process then ends at step 316.

Returning to the verification process at step 304, if the verification of the header 160a of sector 152a of flash memory 104a read in step 206 succeeded, then the process moves to step 318, which depicts memory controller 105 verifying partition offset table 162a of sector 152a of flash memory 104a read in step 206. The process next moves 320. At step 320, memory controller 105 determines whether verification of partition offset table 162a of sector 152a of flash memory 104a read in step 206 succeeded. If memory controller 105 determines that verification of partition offset table 162a of sector 152a of flash memory 104a read in step 206 did not succeed, then the process moves to step 306, which is described above. If memory controller 105 determines that verification of partition offset table 162a of sector 152a of flash memory 104a read in step 206 succeeded, then the process proceeds to step 322. At step 322, memory controller 105 verifies the validity of various partition names 164a in the sector 152a of flash memory 104a read in step 206.

The process then proceeds to step 324, which depicts memory controller 105 determining whether verification of the validity of partition names 164a in sector 152a of flash memory 104a read in step 206 succeeded. If verification of the validity of partition names 164a in sector 152a of flash memory 104a read in step 206 did not succeed, then the process moves to step 306, which is described above. If verification of the validity of partition names 164a in sector 152a of flash memory 104a read in step 206 succeeded, then the process moves to step 326, which illustrates memory controller 105 verifying partition table size 166a of sector 152a of flash memory 104a read in step 206. The process then moves to step 328. At step 328, memory controller 105 determines whether verification of partition table size 166a of sector 152a of flash memory 104a read in step 206 succeeded. If, verification of partition table size 166a of sector 152a of flash memory 104a read in step 206 did not succeed, then the process moves to step 306, which is described above. If verification of partition table size 166a of sector 152a of flash memory 104a read in step 206 succeeded, then the process ends at step 316.

As shown with respect to flash memory 104a and flash memory 104b, the present invention takes advantage of a dual media image design, in which similar copies of formatting data, also called critical data, exist in different sectors 152a and 152b in a flash memory or within multiple units of flash memory. If and when an interruption to an operation touching formatting data 160a-166a causes corruption of a sector 152a of formatting data 160a-166a, the present invention detects the corruption and utilizes a similarly formatted sector 152b as a template to reconstruct the corrupted formatting data 160a-166a. The reconstructed formatting is then used to repair the corrupted sector 152a, allowing the system to return to full capability and function without alerting the user to the corruption.

While the invention has been particularly shown as described with reference to a preferred embodiment, it will be understood by those skilled in the art that various changes in form and detail may be made therein without departing from the spirit and scope of the invention. It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communication links.

What is claimed is:

1. A method for correcting a formatting data error in a flash memory, said method comprising:
   discovering a formatting error in a first formatting data of a first flash memory, wherein said first formatting data includes a first partition table information of said first flash memory;
   extracting from a second flash memory storing second data a second formatting data and transferring said second formatting data to a formatting modification storage unit, wherein said second formatting data includes a second partition table information of said second flash memory, wherein said first partition table information is nonidentical to said second partition table information before a formatting data error is present in said first flash memory;
   replacing in said first flash memory said erroneous first formatting data with formatting data modified within said formatting modification storage unit using template information derived from said second formatting data, without requiring redundant copies of said first formatting data; and
   storing first data in said first flash memory with said formatting data modified within said formatting modification unit using said template information derived from said second formatting data, wherein said first data is different from said second data, wherein said formatting data error is an error in said first flash memory that stores partition table information.

2. The method of claim 1, further comprising the step of generating a copy of said second formatting data of said second flash memory.

3. The method of claim 2, wherein the step of generating a copy of said second formatting data of said second flash memory further comprises the step of copying a binary image of said second formatting data of said second flash memory onto said formatting modification storage unit.

4. The method of claim 3, wherein said step of copying a binary image of said second formatting data of said second flash memory onto said formatting modification storage unit further comprises the step of copying a binary image of said second formatting data of said second flash memory onto a formatting modification storage unit in a memory controller.

5. The method of claim 1, wherein said step of discovering a formatting error in a first formatting data of a first flash memory further comprises:
   verifying a first header in said first flash memory;
   verifying a first partition table offset in said first flash memory;
   verifying a first validity of a partition name in said first flash memory; and
   verifying a first partition table size in said first flash memory.

6. The method of claim 1, wherein said step of replacing in said first flash memory said erroneous first formatting data with formatting data modified within said formatting modification storage unit using template information derived from said second formatting data further comprises the step of modifying said second formatting data of said second flash memory to construct a modification of said first formatting data of said first flash memory.

7. The method of claim 1, wherein said step of extracting from said second flash memory storing second data said second formatting data further comprises extracting a second header, a second partition table offset, a second partition name, and a second partition table size from said second flash memory.

8. A system for correcting a formatting data error in a flash memory, said system comprising:
   at least one processing unit;
   at least one memory coupled to said at least one processing unit;
   a memory controller coupled to said at least one memory, wherein said memory controller includes a formatting modification storage unit; and
   wherein said at least one memory stores executable code for:
   discovering a formatting error in a first formatting data of a first flash memory, wherein said first formatting data includes a first partition table information of said first flash memory;
   extracting from a second flash memory storing second data a second formatting data and transferring said second formatting data to a formatting modification storage unit, wherein said second formatting data includes a second partition table information of said second flash memory, wherein said first partition table information is nonidentical to said second partition table information before a formatting data error is present in said first flash memory;
   replacing in said first flash memory said erroneous first formatting data with formatting data modified within said formatting modification storage unit using template information derived from said second formatting data, without requiring redundant copies of said first formatting data; and
   storing first data in said first flash memory with said formatting data modified within said formatting modification unit using said template information derived from said second formatting data, wherein said first data is different from said second data, wherein said formatting data error is an error in said first flash memory that stores partition table information.

9. The system of claim 8, wherein said at least one memory stores executable code for generating a copy of said second formatting data of said second flash memory.

10. The system of claim 9, wherein said executable code for generating a copy of said second formatting data of said second flash memory further comprises executable code for copying a binary image of said second formatting data of said second flash memory onto said formatting modification storage unit.

11. The system of claim 10, wherein said executable code for copying a binary image of said second formatting data of said second flash memory onto said formatting modification storage unit further comprises executable code for copying a binary image of said second formatting data of said second flash memory onto a formatting modification storage unit in a memory controller.

12. The system of claim 8, wherein said executable code for discovering a formatting error in a first formatting data of a first flash memory further comprises:
   executable code for verifying a first header in said first flash memory;
   executable code for verifying a first partition table offset in said first flash memory;
   executable code for verifying a first validity of a partition name in said first flash memory; and
   executable code for verifying a first partition table size in said first flash memory.

13. The system of claim 8, wherein said executable code for replacing in said first flash memory said erroneous first formatting data with formatting data modified within said formatting modification storage unit using template information derived from said second formatting data further comprises executable code for modifying said second formatting data of said second flash memory to construct a modification of said first formatting data of said first flash memory.

14. The system of claim 8, wherein said executable code for extracting from said second flash memory storing second data said second formatting data further comprises executable code for extracting a second header, a second partition table offset, a second partition name, and a second partition table size from said second flash memory.

15. A tangible machine-readable storage medium having a plurality of instructions processable by at least one processing unit contained within a machine embodied therein, wherein said plurality of instructions, when processed by said at least one processing unit, causes said machine to perform a method for correcting a formatting data error in a flash memory comprising:

discovering a formatting error in a first formatting data of a first flash memory, wherein said first formatting data includes a first partition table information of said first flash memory;

extracting from a second flash memory storing second data a second formatting data and transferring said second formatting data to a formatting modification storage unit, wherein said second formatting data includes a second partition table information of said second flash memory, wherein said first partition table information is nonidentical to said second partition table information before a formatting data error is present in said first flash memory;

replacing in said first flash memory said erroneous first formatting data with formatting data modified within said formatting modification storage unit using template information derived from said second formatting data, without requiring redundant copies of said first formatting data; and storing first data in said first flash memory with said formatting data modified within said formatting modification unit using said template information derived from said second formatting data, wherein said first data is different from said second data, wherein said formatting data error is an error in said first flash memory that stores partition table information.

16. The tangible machine-readable storage medium of claim 15, said method further comprising the step of generating a copy of said second formatting data of said second flash memory.

17. The tangible machine-readable storage medium of claim 16, wherein the step of generating a copy of said second formatting data of said second flash memory further comprises the step of copying a binary image of said second formatting data of said second flash memory onto said formatting modification storage unit.

18. The tangible machine-readable storage medium of claim 17, wherein said step of copying a binary image of said second formatting data of said second flash memory onto said formatting modification storage unit further comprises the step of copying a binary image of said second formatting data of said second flash memory onto a formatting modification storage unit in a memory controller.

19. The tangible machine-readable storage medium of claim 15, wherein said step of discovering a formatting error in a first formatting data of a first flash memory further comprises:

verifying a first header in said first flash memory;
verifying a first partition table offset in said first flash memory;
verifying a first validity of a partition name in said first flash memory; and
verifying a first partition table size in said first flash memory.

20. The tangible machine-readable storage medium of claim 15, wherein said step of replacing in said first flash memory said erroneous first formatting data with formatting data modified within said formatting modification storage unit using template information derived from said second formatting data further comprises the step of modifying said second formatting data of said second flash memory to construct a modification of said first formatting data of said first flash memory.

* * * * *